(12) United States Patent
Arena et al.

(10) Patent No.: US 8,214,557 B2
(45) Date of Patent: Jul. 3, 2012

(54) MEASURING DIRECT MEMORY ACCESS THROUGHPUT

(75) Inventors: Antonio Arena, Arlington Heights, IL (US); German Borkhovik, Prairie View, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 12/766,923

(22) Filed: Apr. 26, 2010

(65) Prior Publication Data

US 2011/0264830 A1  Oct. 27, 2011

(51) Int. Cl.
*G06F 3/00* (2006.01)
*G06F 5/00* (2006.01)

(52) U.S. Cl. ............... 710/36; 710/5; 710/8; 710/15; 710/22; 710/33

(58) Field of Classification Search .............. None
See application file for complete search history.

(56) References Cited

U.S. PATENT DOCUMENTS

| | | |
|---|---|---|
| 4,502,117 A | 2/1985 | Kihara |
| 5,091,870 A | 2/1992 | Datsko et al. |
| 7,146,285 B2 | 12/2006 | Wheless, Jr. et al. |
| 2008/0195831 A1* | 8/2008 | Tsukamoto et al. .......... 711/167 |
| 2009/0228615 A1* | 9/2009 | Beckert et al. ................. 710/21 |
| 2009/0248911 A1* | 10/2009 | Conroy et al. ................. 710/25 |

FOREIGN PATENT DOCUMENTS

WO   2005/003976 A1   1/2005

OTHER PUBLICATIONS

Bell, David, DMA and CPU: Data Access Performance, Aug. 200, Texas Instruments, [online, accessed on Jul. 17, 2011], URL:http://focus.ti.com.cn/cn/lit/an/spra614a/spra614a.pdf.*
International Search Report dated Aug. 1, 2011 from corresponding International Patent Application No. PCT/US2011/033801.
David Bell, Eric Biscondi, TMS320C620x/TMS3206701 DMA and CPU: Data Access Performance., Texas Instruments Application Report, Aug. 2000, pp. 1-28, SPRA614A.
PCT/US2011/033801 International Search Report.

* cited by examiner

*Primary Examiner* — Scott Sun

(57) ABSTRACT

Methods and systems for measuring available direct memory access (DMA) throughput are disclosed, including providing a plurality of DMA channels, the DMA channels comprising a measuring DMA channel and other DMA channels, the measuring DMA channel having a lowest data rate priority, and determining an available DMA throughput by measuring a current data rate at which the measuring DMA channel is serviced in response to initiating a data transfer on the measuring DMA channel.

21 Claims, 6 Drawing Sheets

MEASURING DIRECT MEMORY ACCESS THROUGHPUT

I. BACKGROUND

The invention relates generally to the field of Direct Memory Access (DMA).

II. SUMMARY

In one respect, disclosed is a method for determining DMA throughput, the method comprising: providing a plurality of DMA channels, the DMA channels comprising a measuring DMA channel and other DMA channels, the measuring DMA channel having a lowest data rate priority; and determining an available DMA throughput by measuring a current data rate at which the measuring DMA channel is serviced in response to initiating a data transfer on the measuring DMA channel.

In another respect, disclosed is an apparatus for measuring available DMA throughput, the apparatus comprising: one or more microcontrollers; a plurality of DMA channels coupled to the one or more microcontrollers, the DMA channels comprising a measuring DMA channel and other DMA channels, the measuring DMA channel having a lowest data rate priority; and a data rate tool coupled to the measuring DMA channel, the data rate tool being configured to measure a current data rate at which the measuring DMA channel is serviced in response to initiating a data transfer on the measuring DMA channel.

In yet another respect, disclosed is a computer program product stored on a computer operable medium, the computer program product comprising software code being effective to measure available DMA throughput by being effective to: be provided with a plurality of DMA channels, the DMA channels comprising a measuring DMA channel and other DMA channels, the measuring DMA channel having a lowest data rate priority; and determining an available DMA throughput by causing a measurement of a current data rate at which the measuring DMA channel is serviced in response to initiating a data transfer on the measuring DMA channel.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
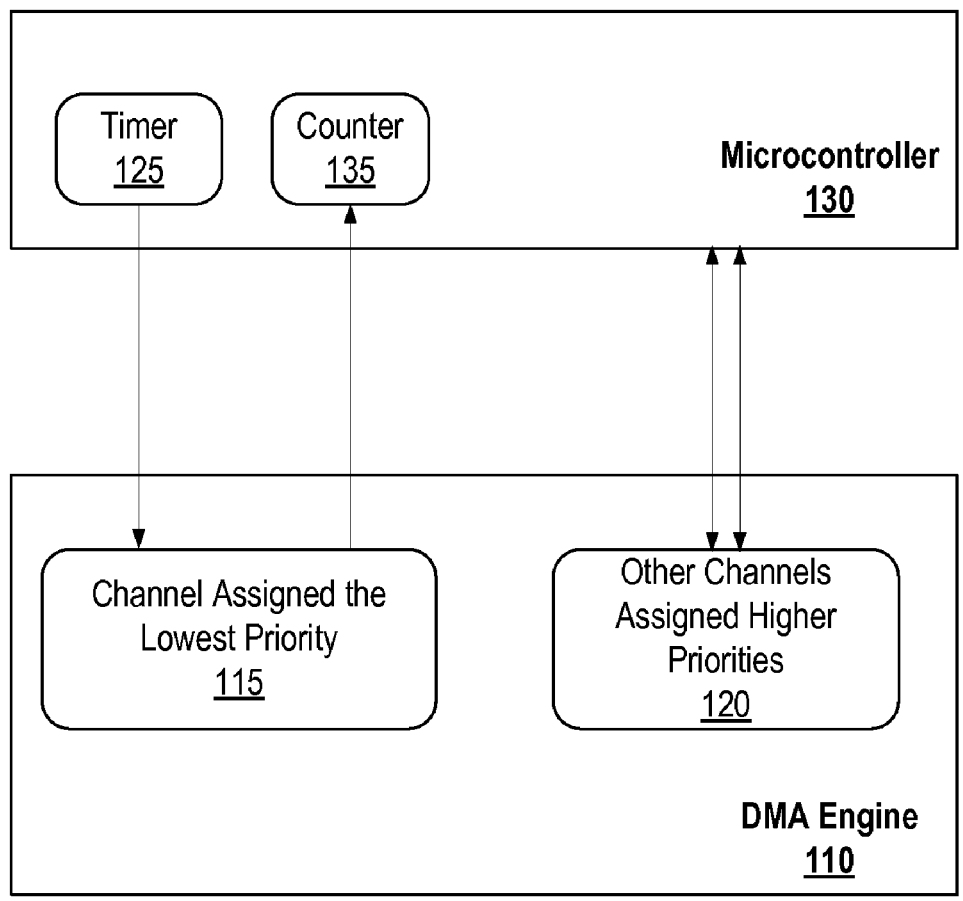
FIG. 1 is a block diagram illustrating an apparatus for measuring available DMA throughput based on measuring a current data rate at which a DMA channel assigned the lowest priority is serviced, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, knowing the available throughput of the DMA engine could assist in preventing a bottleneck of the DMA engine. If a high DMA utilization is measured, then containment actions such as shutting down inessential features may be implemented. If the microcontroller DMA engine supports prioritization of its channels, then available DMA throughput may be measured and monitored while software applications are running on the microcontroller. In order to monitor available DMA throughput, a DMA channel may be assigned the lowest priority. The service rate of this DMA channel assigned the lowest priority is first measured while all the other DMA channels are disabled. After this initial service rate is measured, the DMA engine may be used during the operation of software applications running on the microcontroller. During the running of software applications, the service rate of the DMA channel assigned the lowest priority may be measured. The available throughput of the DMA engine may then be calculated by taking the ratio between the most recent service rate measurement and the initial service rate measurement. Measuring available throughput by first measuring the initial service rate would permit the self calibration of the DMA engine.

In some embodiments, the service rate of the DMA channel assigned the lowest priority while all the other DMA channels are disabled may be measured once. This initial service rate then becomes a preconfigured property of the DMA engine, making it unnecessary for an initial service rate measurement before the running of software applications on the microcontroller.

In some embodiments, the service rate of the DMA channel assigned the lowest priority may be measured by continuously activating the idle DMA channel with a fast rate timer. The fast rate timer may be configured to alternatively transfer an ON ('1') or an OFF ('0') value to the hardware register that controls the available output pin of the microcontroller. The number of times the DMA channel assigned the lowest priority was serviced may be determined by counting the number of edge transitions resulting from the logic change. The number of edge transitions counted in an arbitrary amount of time equals the number of times the DMA channel assigned the lowest priority was serviced in the same arbitrary amount of time.

In some embodiments, instead of servicing the DMA channel assigned the lowest priority with alternating ON or OFF values, the DMA channel assigned the lowest priority may be serviced with a sequence of ON values followed by a sequence of OFF values. Servicing the DMA channel assigned the lowest priority in such a fashion would slow the number of edge transitions that would need to be counted.

In some embodiments, the edge transitions may be measured with an external device such as a digital oscilloscope. In the case of servicing the DMA channel with alternating transfers of ON and OFF values, the digital oscilloscope would essentially be measuring a pulse width modulation (PWM) whose average frequency is exactly half the rate at which the DMA channel assigned the lowest priority is serviced. If the DMA channel is instead serviced with a sequence of ON values followed by a sequence of OFF values, then the measured PWM average frequency would be some other fraction of the rate at which the DMA channel assigned the lowest priority is serviced. For example, if the DMA channel is serviced with a repeating set of two consecutive ON values followed by two consecutive OFF values, then the measured PWM average frequency would be one-quarter the rate at which the DMA channel assigned the lowest priority is serviced. Using an external digital oscilloscope would also permit the use of more complex tools for statistical analysis of the time between edge transitions. By monitoring the time between edge transitions, the DMA utilization may be characterized during the running of software applications and over a range of scenarios.

In some embodiments, the edge transitions may be measured with a microcontroller. The microcontroller may either be the same microcontroller that is being serviced by the DMA engine or may be another microcontroller all together. If it is the same microcontroller, then the signal coming from the DMA channel assigned the lowest priority may either be routed externally or internally. If it is routed internally, then the use of an external pin of the microcontroller may be conserved. Additionally, if the same microcontroller is used, logging the run-time measure of the DMA utilization would allow running applications to take containment actions in order to prevent a bottleneck of the DMA engine.

In some embodiments, an automotive controller assembly such as an engine control unit, a telematics unit, or a transmission controller may have an integrated DMA controller. The DMA controller may comprise one or more microcontrollers coupled to a plurality of DMA channels. One of the DMA channels would be assigned the lowest data rate priority and would be used as the measuring DMA channel. The DMA throughput would be measured by a data rate tool coupled to the measuring DMA channel and configured to measure the current data rate at which the DMA channel is serviced in response to initiating a data transfer on the measuring DMA channel.

FIG. 1 is a block diagram illustrating an apparatus for measuring available DMA throughput based on measuring a current data rate at which a DMA channel assigned the lowest priority is serviced, in accordance with some embodiments.

In some embodiments, DMA engine 110 comprises a measuring channel assigned the lowest priority 115 and other channels assigned higher priorities 120. The measuring channel assigned the lowest priority 115 is serviced with a timer 125 from the microcontroller 130. In alternative embodiments, other data rate measurements may be used. The timer 125 may be configured to alternatively transfer an ON or an OFF value. The number of times the idle channel 115 was serviced may then be counted by a counter 135 which counts the number of edge transitions resulting from the alternating transfer of ON and OFF values. All the while that the channel assigned the lowest priority 115 is being serviced with the timer 125, the other channels 120 may be used by the microcontroller 130 during the running of software applications.

Figure 2:
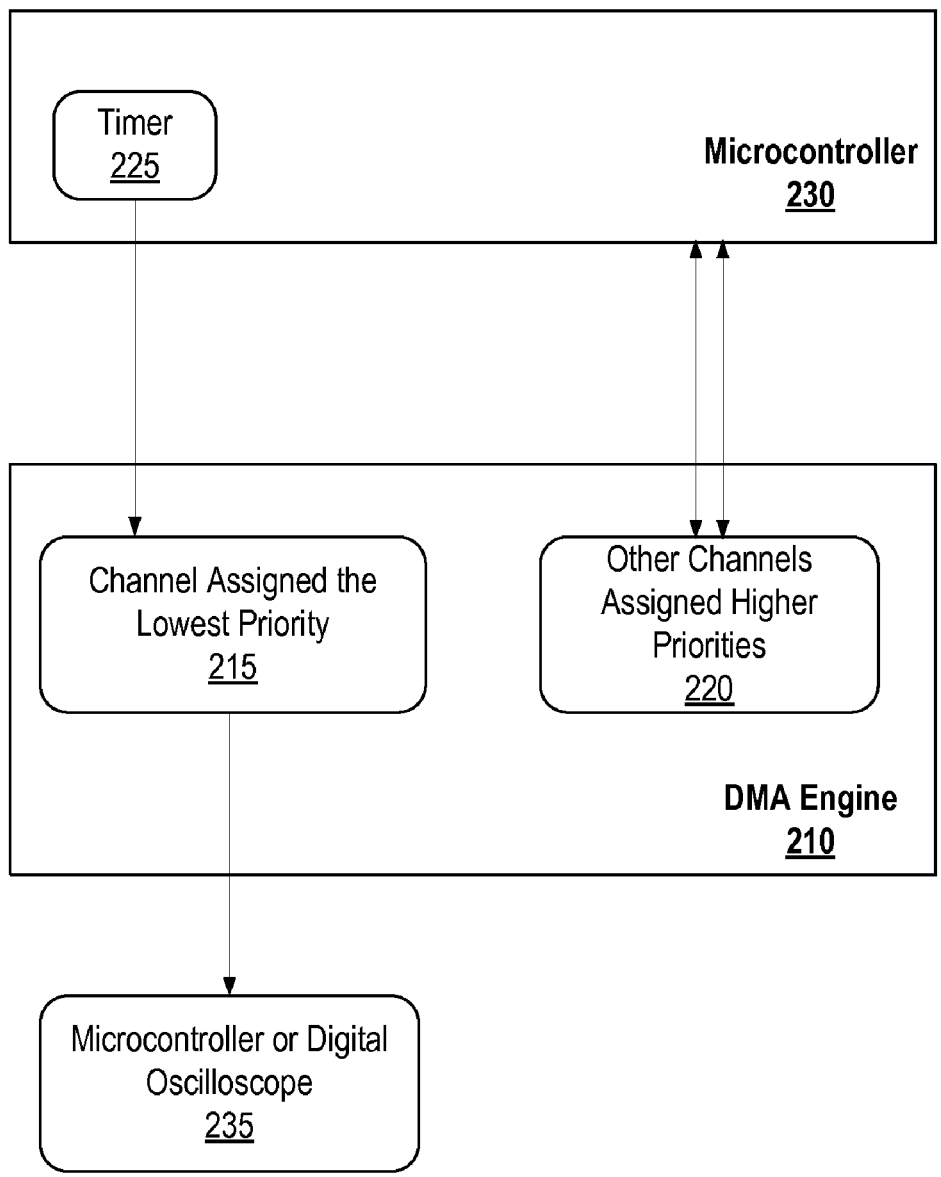
FIG. 2 is a block diagram illustrating an alternative apparatus for measuring available DMA throughput based on measuring a current data rate at which a DMA channel assigned the lowest priority is serviced, in accordance with some embodiments.

FIG. 2 is a block diagram illustrating an alternative apparatus for measuring available DMA throughput based on measuring a current data rate at which a DMA channel assigned the lowest priority is serviced, in accordance with some embodiments.

In some embodiments, DMA engine 210 comprises a measuring channel assigned the lowest priority 215 and other channels assigned higher priorities 220. The channel assigned the lowest priority 215 is serviced with a timer 225 from the microcontroller 230. The timer 225 may be configured to alternatively transfer an ON or an OFF value. The number of times the channel assigned the lowest priority 115 was serviced may then be counted by either another microcontroller or digital oscilloscope 235.

Figure 3:
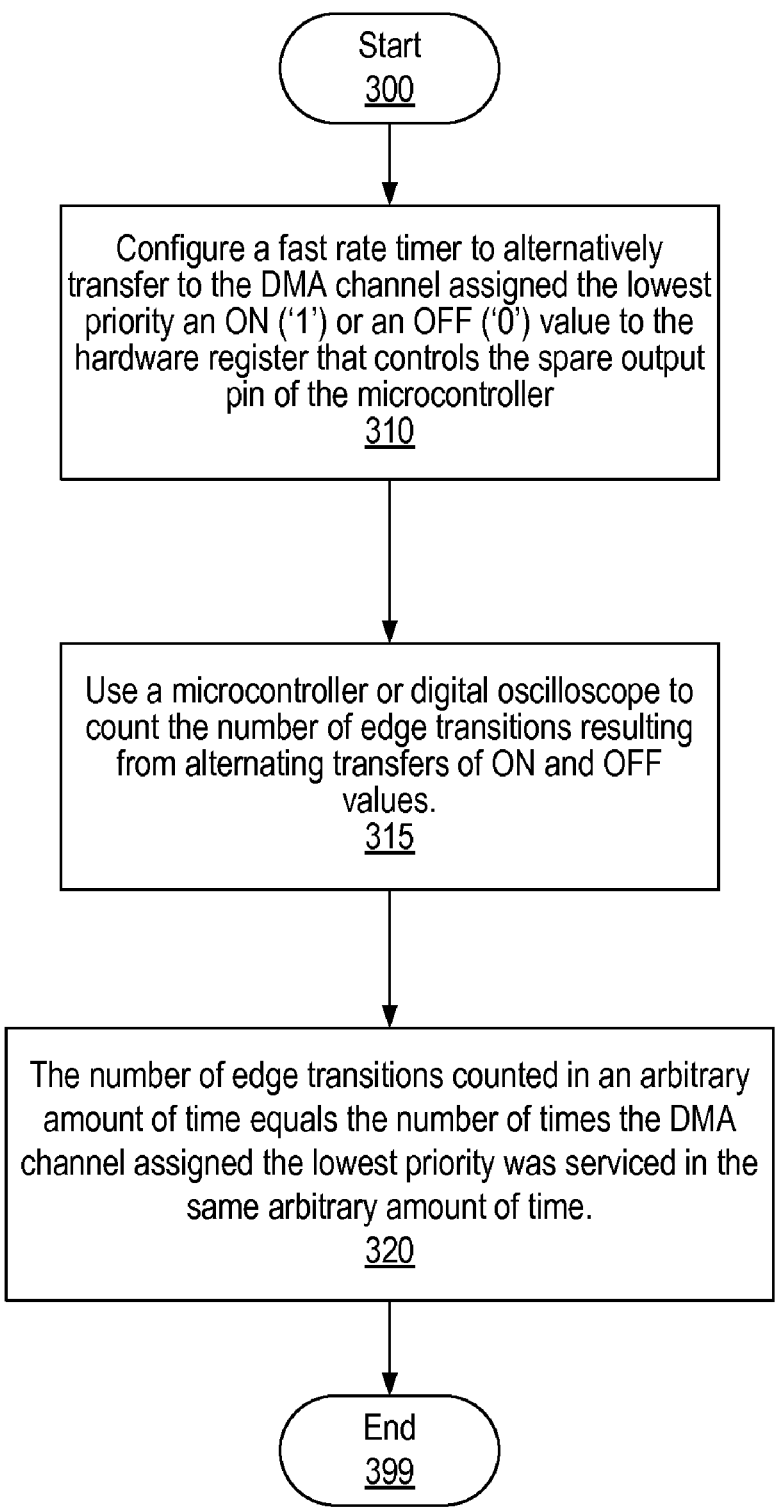
FIG. 3 is a flow diagram illustrating a method for measuring the service rate of a DMA channel assigned the lowest priority, in accordance with some embodiments.

FIG. 3 is a flow diagram illustrating a method for measuring the service rate of a DMA channel assigned the lowest priority, in accordance with some embodiments. In some embodiments, the method illustrated in FIG. 3 may be performed by one or more of the devices illustrated in FIG. 1 and FIG. 2. Processing begins at 300 whereupon, at block 310, a fast rate timer is configured to alternatively transfer to the measuring DMA channel assigned the lowest priority an ON or an OFF value to the hardware register that controls the available output pin of the microcontroller. At block 315, the number of edge transitions resulting from alternating transfers of ON and OFF values is counted either with a microcontroller or a digital oscilloscope. At block 320, the number of edge transitions counted in an arbitrary amount of time equals the number of times the DMA channel assigned the lowest priority was serviced in the same arbitrary amount of time. Processing subsequently ends at 399.

Figure 4:
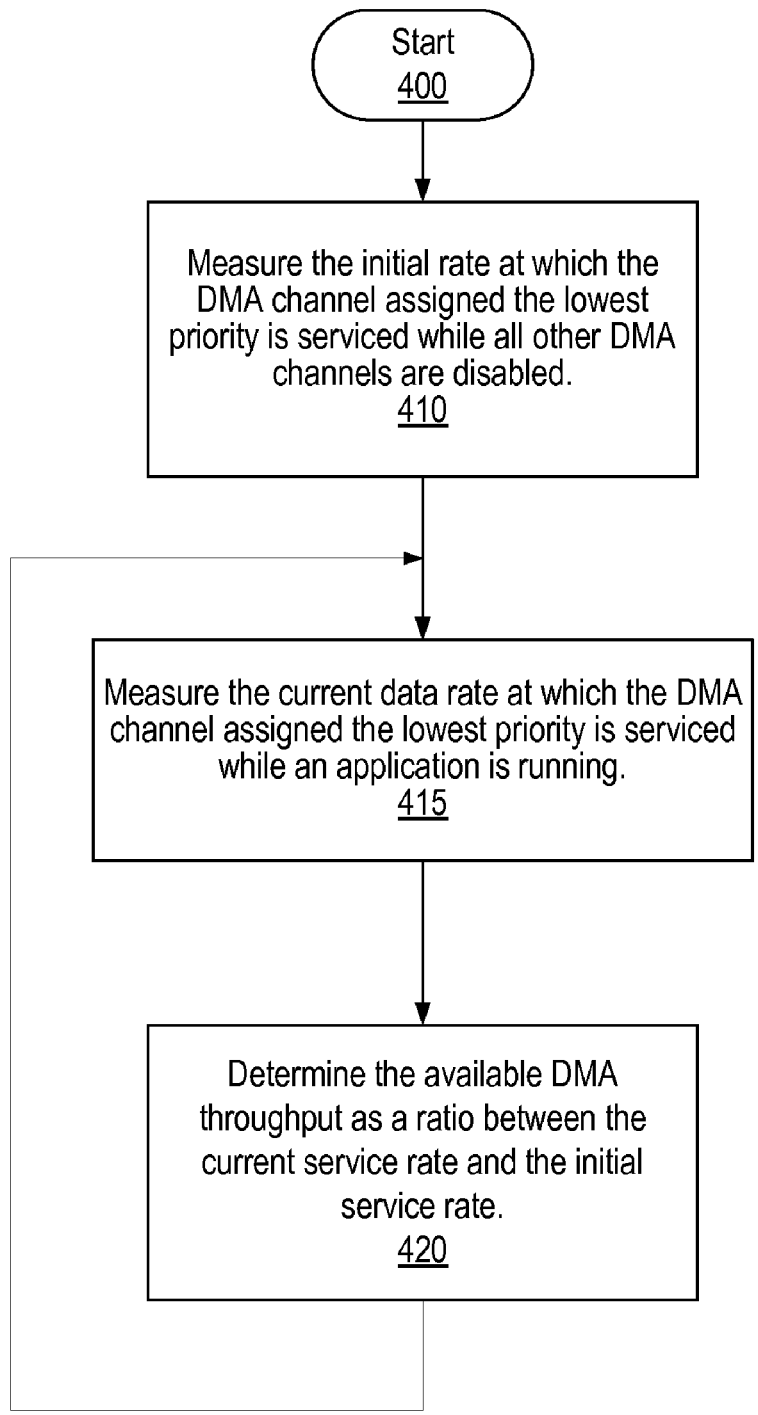
FIG. 4 is a flow diagram illustrating a method for measuring available DMA throughput based on measuring an initial service rate of a DMA channel assigned the lowest priority and measuring a current data rate at which the DMA channel assigned the lowest priority is serviced, in accordance with some embodiments.

FIG. 4 is a flow diagram illustrating a method for measuring available DMA throughput based on measuring an initial service rate of a DMA channel assigned the lowest priority and measuring a current data rate at which the DMA channel assigned the lowest priority is serviced, in accordance with some embodiments.

Processing begins at 400 whereupon, at block 410, the initial rate at which the measuring DMA channel assigned the lowest priority is serviced while all other DMA channels are disabled is measured. In block 415, the current rate at which the DMA channel assigned the lowest priority is serviced while an application is running is measured. In block 420, the available DMA throughput is determined as a ratio between the current service rate and the initial service rate. The idle channel is continuously monitored by repeating blocks 415 and 420.

Figure 5:
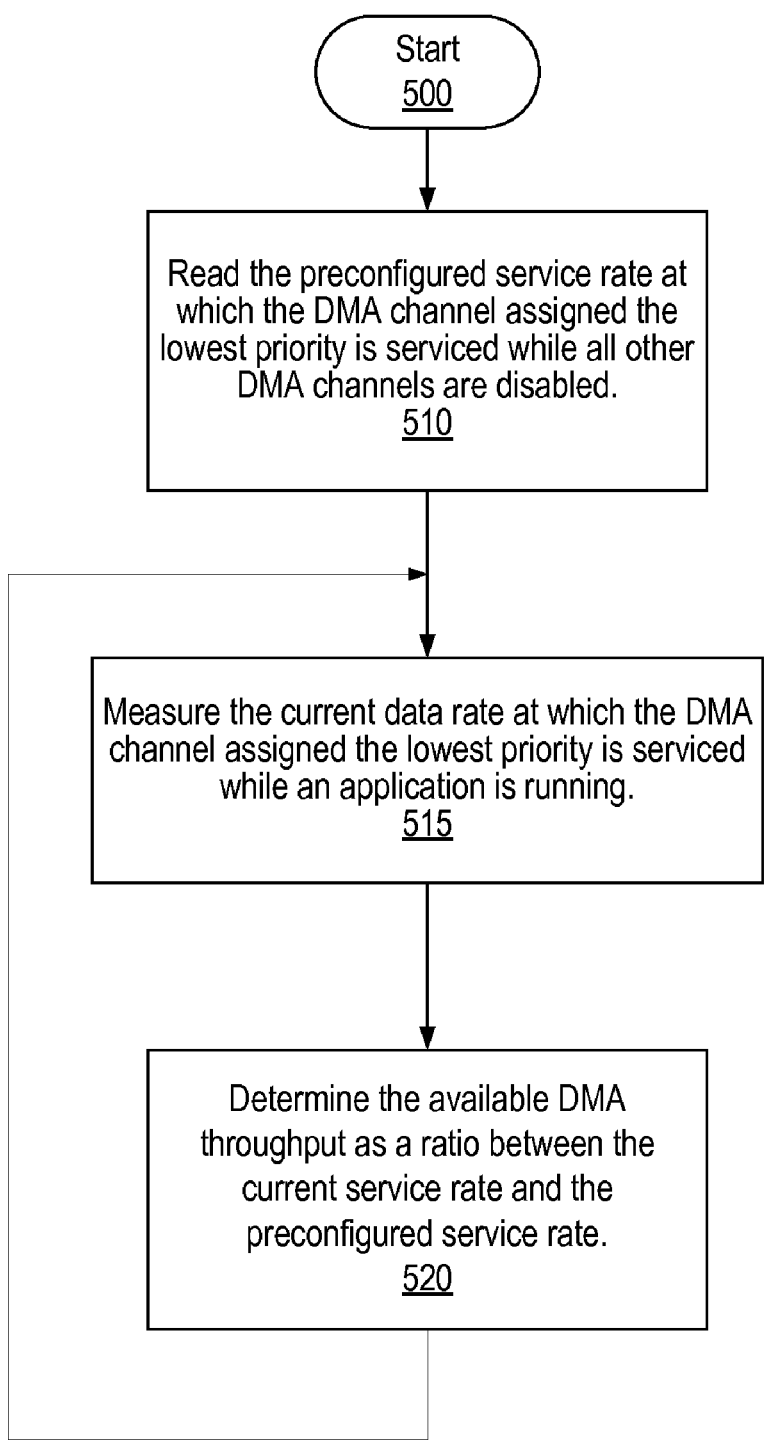
FIG. 5 is a flow diagram illustrating a method for measuring available DMA throughput based on reading a preconfigured service rate of a DMA channel assigned the lowest priority and measuring a current data rate at which the DMA channel assigned the lowest priority is serviced, in accordance with some embodiments.

FIG. 5 is a flow diagram illustrating a method for measuring available DMA throughput based on reading a preconfigured service rate of a DMA channel assigned the lowest priority and measuring a current data rate at which the DMA channel assigned the lowest priority is serviced, in accordance with some embodiments.

Processing begins at 500 whereupon, at block 510, where the preconfigured rate at which the measuring DMA channel assigned the lowest priority is serviced while all other DMA channels are disable is read. In block 515, the current rate at which the DMA channel assigned the lowest priority is serviced while an application is running is measured. In block 520, the available DMA throughput is determined as a ratio between the current service rate and the preconfigured service rate. The idle channel is continuously monitored by repeating blocks 515 and 520.

Figure 6:
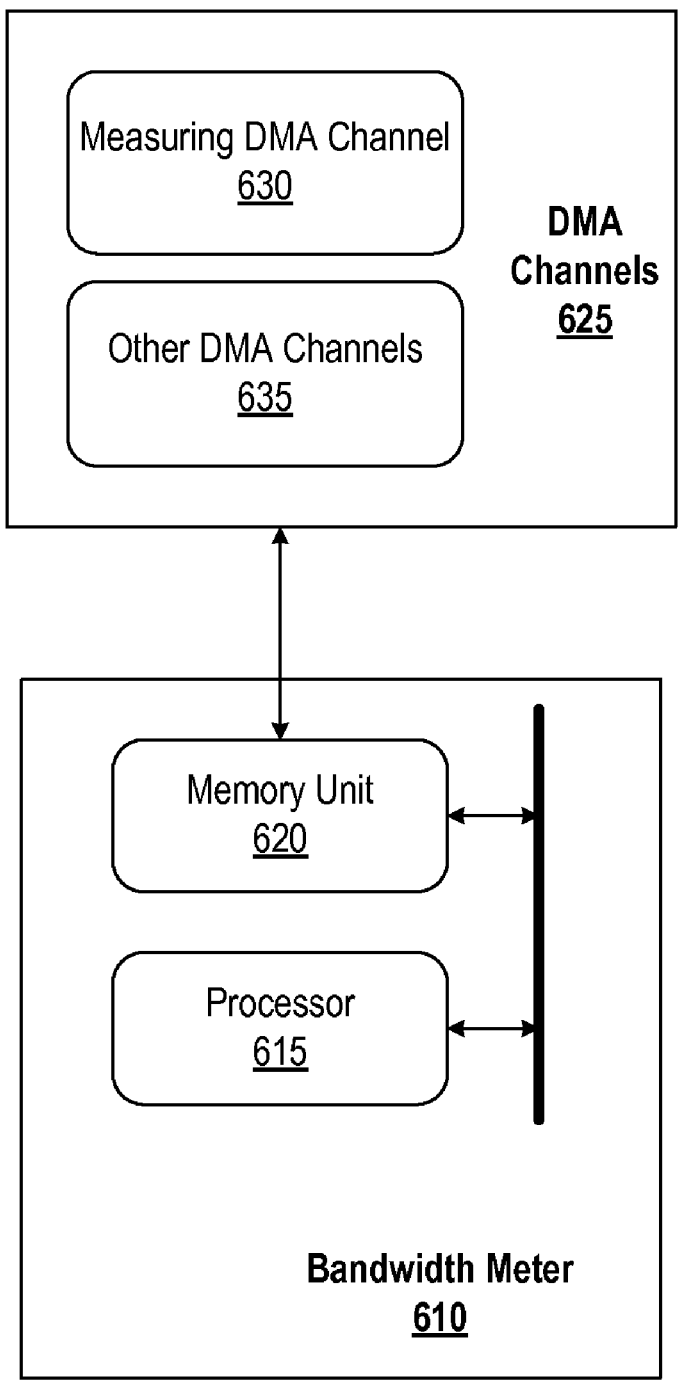
FIG. 6 is a block diagram illustrating a bandwidth meter for measuring available DMA throughput, in accordance with some embodiments.

FIG. 6 is a block diagram illustrating a bandwidth meter for measuring available DMA throughput, in accordance with some embodiments.

In some embodiments, bandwidth meter 610 comprises processor 615 and memory unit 620. Processor 615 is configured to perform computations and general control operations and memory unit 620 is configured to measure available DMA throughput by being effective to be provided with a plurality of DMA channels 625. The DMA channels 625 comprise a measuring DMA channel 630 having a lowest data rate priority and other DMA channels 635. The available DMA throughput is determined by causing a measurement of a current data rate at which the measuring DMA channel 630 is serviced in response to initiating a data transfer on the measuring DMA channel 630.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for determining DMA throughput, the method comprising:
providing a plurality of DMA channels, the DMA channels comprising a measuring DMA channel and other DMA channels, the measuring DMA channel having a lowest priority of the plurality of DMA channels; and
determining an available DMA throughput by measuring a current data rate at which the measuring DMA channel is serviced in response to initiating a data transfer on the measuring DMA channel.

2. The method of claim 1, further comprising comparing the current data rate to an idle data rate, the idle data rate being a rate at which the measuring DMA channel is serviced while the other DMA channels are disabled.

3. The method of claim 2, where the idle data rate is preconfigured.

4. The method of claim 1, where initiating a data transfer comprises alternatively transferring an ON or an OFF value to a hardware register that controls the measuring DMA channel output pin.

5. The method of claim 4, where measuring the current data rate of the measuring DMA channel comprises counting the number of edge transitions resulting from alternatively transferring the ON or the OFF values to the DMA channel assigned the lowest priority output pin within an arbitrary length of time.

6. The method of claim 5, further comprising using a digital oscilloscope to measure the number of edge transitions.

7. The method of claim 5, further comprising using a microcontroller to measure the number of edge transitions.

8. An apparatus for measuring available DMA throughput, the apparatus comprising:
one or more processors; and
one or more memory units coupled to the processors,
the apparatus being configured to:
couple to a plurality of DMA channels, the DMA channels comprising a measuring DMA channel and other DMA channels, the measuring DMA channel having a lowest priority of the plurality of DMA channels; and
measure a current data rate at which the measuring DMA channel is serviced in response to initiating a data transfer on the measuring DMA channel.

9. The apparatus of claim 8, where the apparatus is further configured to compare the current data rate to an idle data rate, the idle data rate being a rate at which the measuring DMA channel is serviced while the other DMA channels are disabled.

10. The apparatus of claim 9, where the apparatus is preconfigured with the data rate of the DMA channel assigned the lowest priority while all other DMA channels are disabled.

11. The apparatus of claim 8, where the apparatus is further configured to service the measuring DMA channel by alternatively transferring an ON or an OFF value to a hardware register that controls the DMA channel assigned the lowest priority output pin.

12. The apparatus of claim 11, where the apparatus being configured to initiate a data transfer comprises the apparatus being configured to count the number of edge transitions resulting from alternatively transferring the ON or the OFF values to the measuring within an arbitrary length of time.

13. The apparatus of claim 12, where the data rate tool comprises a digital oscilloscope to measure the number of edge transitions.

14. The apparatus of claim 12, where the data rate tool comprises a microcontroller to measure the number of edge transitions.

15. The apparatus of claim 8, further comprising a vehicle, where the apparatus is mounted to the vehicle.

16. A computer program product stored on a computer operable medium, the computer program product comprising software code being effective to measure available DMA throughput by being effective to:
be provided with a plurality of DMA channels, the DMA channels comprising a measuring DMA channel and other DMA channels, the measuring DMA channel having a lowest priority of the plurality of DMA channels; and
determining an available DMA throughput by causing a measurement of a current data rate at which the measuring DMA channel is serviced in response to initiating a data transfer on the measuring DMA channel.

17. The computer program product of claim 16, further comprising comparing the current data rate to an idle data rate, the idle data rate being a rate at which the measuring DMA channel is serviced while the other DMA channels are disabled.

18. The computer program product of claim 17, where the idle data rate is preconfigured.

19. The computer program product of claim 16, where the software code is further configured to cause a measurement of the current data rate by causing alternating ON or OFF values to be transferred to a hardware register that controls the DMA channel.

20. The computer program product of claim 19, where the software code is further configured to cause the measurement of the current data rate by causing the counting of a number of edge transitions resulting from alternatively transferring the ON or the OFF values to the measuring DMA channel output pin within an arbitrary length of time.

21. An automotive assembly, the automotive assembly comprising:
- an engine control unit, a telematics unit, a transmission controller, or any other automotive controller;
- one or more microcontrollers;
- a plurality of DMA channels coupled to the one or more microcontrollers, the DMA channels comprising a measuring DMA channel and other DMA channels, the measuring DMA channel having a lowest priority of the plurality of DMA channels; and
- a data rate tool coupled to the measuring DMA channel, the data rate tool being configured to measure a current data rate at which the measuring DMA channel is serviced in response to initiating a data transfer on the measuring DMA channel.

* * * * *